United States Patent
He et al.

(10) Patent No.: US 11,425,555 B2
(45) Date of Patent: Aug. 23, 2022

(54) UE ASSISTANCE INFORMATION FOR POWER SAVING CONFIGURATION

(71) Applicant: QUALCOMM Incorporated, San Diego, CA (US)

(72) Inventors: Linhai He, San Diego, CA (US); Wooseok Nam, San Diego, CA (US); Tao Luo, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/701,062

(22) Filed: Dec. 2, 2019

(65) Prior Publication Data
US 2020/0186991 A1  Jun. 11, 2020

Related U.S. Application Data

(60) Provisional application No. 62/775,790, filed on Dec. 5, 2018.

(51) Int. Cl.
| | |
|---|---|
| *H04W 8/18* | (2009.01) |
| *H04W 76/28* | (2018.01) |
| *H04W 52/02* | (2009.01) |
| *H04L 5/14* | (2006.01) |
| *H04W 24/08* | (2009.01) |

(Continued)

(52) U.S. Cl.
CPC .......... *H04W 8/183* (2013.01); *H04L 5/1469* (2013.01); *H04W 24/08* (2013.01); *H04W 52/0277* (2013.01); *H04W 72/046* (2013.01); *H04W 72/0453* (2013.01); *H04W 76/27* (2018.02); *H04W 76/28* (2018.02)

(58) Field of Classification Search
CPC ..... H04W 8/183; H04W 76/28; H04W 76/27; H04W 24/08; H04W 52/0277; H04W 72/0453; H04W 72/046; H04L 5/1469
See application file for complete search history.

(56) References Cited

U.S. PATENT DOCUMENTS

2013/0242833 A1* 9/2013 Ahn ............... H04W 52/0216
370/311
2018/0014347 A1* 1/2018 Nagasaka ........ H04W 52/0216
(Continued)

OTHER PUBLICATIONS

3GPP TSG RAN WG1 Meeting #95 R1-1812231 (Year: 2018).*
(Continued)

*Primary Examiner* — Ricky Q Ngo
*Assistant Examiner* — Stephen N Steiner
(74) *Attorney, Agent, or Firm* — Yanling Yang

(57) ABSTRACT

An UE transmits at least one UE configuration parameter to a base station comprising at least one preferred parameter for a UE configuration, e.g., in addition to a preferred setting for a delay budget report. The UE then receives a configuration from the base station based, at least in part, on the at least one UE configuration parameter transmitted to the base station. Additionally, a base station receives the at least one UE configuration parameter from a UE comprising at least one preferred parameter for a UE configuration, e.g., in addition to a preferred setting for a delay budget report. The base station then configures the UE using the at least one UE configuration parameter received from the UE.

31 Claims, 10 Drawing Sheets

(51) Int. Cl.
*H04W 72/04* (2009.01)
*H04W 76/27* (2018.01)

(56) References Cited

U.S. PATENT DOCUMENTS

| | | | |
|---|---|---|---|
| 2019/0215729 A1* | 7/2019 | Oyman | H04L 65/80 |
| 2019/0246420 A1* | 8/2019 | Park | H04W 72/0433 |
| 2020/0022095 A1* | 1/2020 | Kim | H04W 76/15 |
| 2020/0059395 A1* | 2/2020 | Chen | H04W 76/19 |

OTHER PUBLICATIONS

Huawei, et al., "Power Saving Techniques," 3GPP Draft, 3GPP TSG RAN WG1 Meeting #95, R1-1812231, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554103, 7 pages, Retrieved from the Internet: URL: http://www.3gpp.org/ftp/Meetings%5F3GPP%5FSYNC/RAN1/Docs/R1%2D1812231%2Ezip [retrieved on Nov. 11, 2018], the whole document.
International Search Report and Written Opinion—PCT/US2019/064300—ISA/EPO—dated Feb. 25, 2020.
OPPO: "UE Adaptation to the Traffic and UE Power Consumption," 3GPP Draft, 3GPP TSG RAN WG1 Meeting #95, R1-1812824, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554784, 10 pages, Retrieved from the Internet: URL: http://www.3gpp.org/ftp/Meetings%5F3GPP%5FSYNC/RAN1/Docs/R1%2D1812824%2Ezip [retrieved on Nov. 11, 2018], the whole document.
Qualcomm Incorporated: "UE Adaptation to the Traffic and UE Power Consumption Characteristics," 3GPP Draft, 3GPP TSG-RAN WG1 Meeting #95, R1-1813447, UE Adaptation for Power Saving, 3rd Generation Partnership Project (3GPP), France, vol. RAN WG1, No. Spokane, Washington, USA, Nov. 12, 2018-Nov. 16, 2018, Nov. 11, 2018, XP051555486, 20 pages, Retrieved from the Internet: URL: http://www.3gpp.org/ftp/Meetings%5F3GPP%5FSYNC/RAN1/Docs/R1%2D1813447%2Ezip [retrieved on Nov. 11, 2018], Section 5.2, the whole document.
ZTE: "Considerations on Triggering for UE Power Saving", 3GPP Draft, 3GPP TSG RAN WG1 Meeting #95, R1-1812422, Considerations, vol. RAN WG1, No. Spokane, USA, Nov. 12, 2018-Nov. 16, 2018, Nov. 11, 2018 (Nov. 11, 2018), XP051554338, 7 pages, Retrieved from the Internet: URL: http://www.3gpp.org/ftp/Meetings%5F3GPP%5FSYNC/RAN1/Docs/R1%2D1812422%2Ezip [retrieved on Nov. 11, 2018], the whole document.

* cited by examiner

UE ASSISTANCE INFORMATION FOR POWER SAVING CONFIGURATION

CROSS REFERENCE TO RELATED APPLICATION(S)

This application claims the benefit of U.S. Provisional Application Ser. No. 62/775,790, entitled "UE Assistance Information for Power Saving Configuration" and filed on Dec. 5, 2018, which is expressly incorporated by reference herein in its entirety.

BACKGROUND

Technical Field

The present disclosure relates generally to communication systems, and more particularly, to a communication between a User Equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A network may control a radio configuration for a user equipment (UE). Aspects presented herein enable the network to determine more effective radio configurations for a particular UE by having the UE provide information about the UE, such as configuration preferences, with the base station. The base station may then determine radio configurations for the UE based on an increased understanding of factors and preferences for the UE.

In an aspect of the disclosure, a method, a computer-readable medium, and an apparatus are provided for wireless communication at a UE. The apparatus transmits at least one UE configuration parameter to a base station comprising at least one preferred parameter for a UE configuration, e.g., in addition to a preferred setting for a delay budget report. The UE then receives a configuration from the base station based, at least in part, on the UE configuration parameter(s) transmitted to the base station.

In an aspect of the disclosure, a method, a computer-readable medium, and an apparatus are provided for wireless communication at a base station. The apparatus receives at least one UE configuration parameter from a UE comprising at least one preferred parameter for a UE configuration, e.g., in addition to a preferred setting for a delay budget report. The base station then configures the UE using the UE configuration parameter(s) received from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
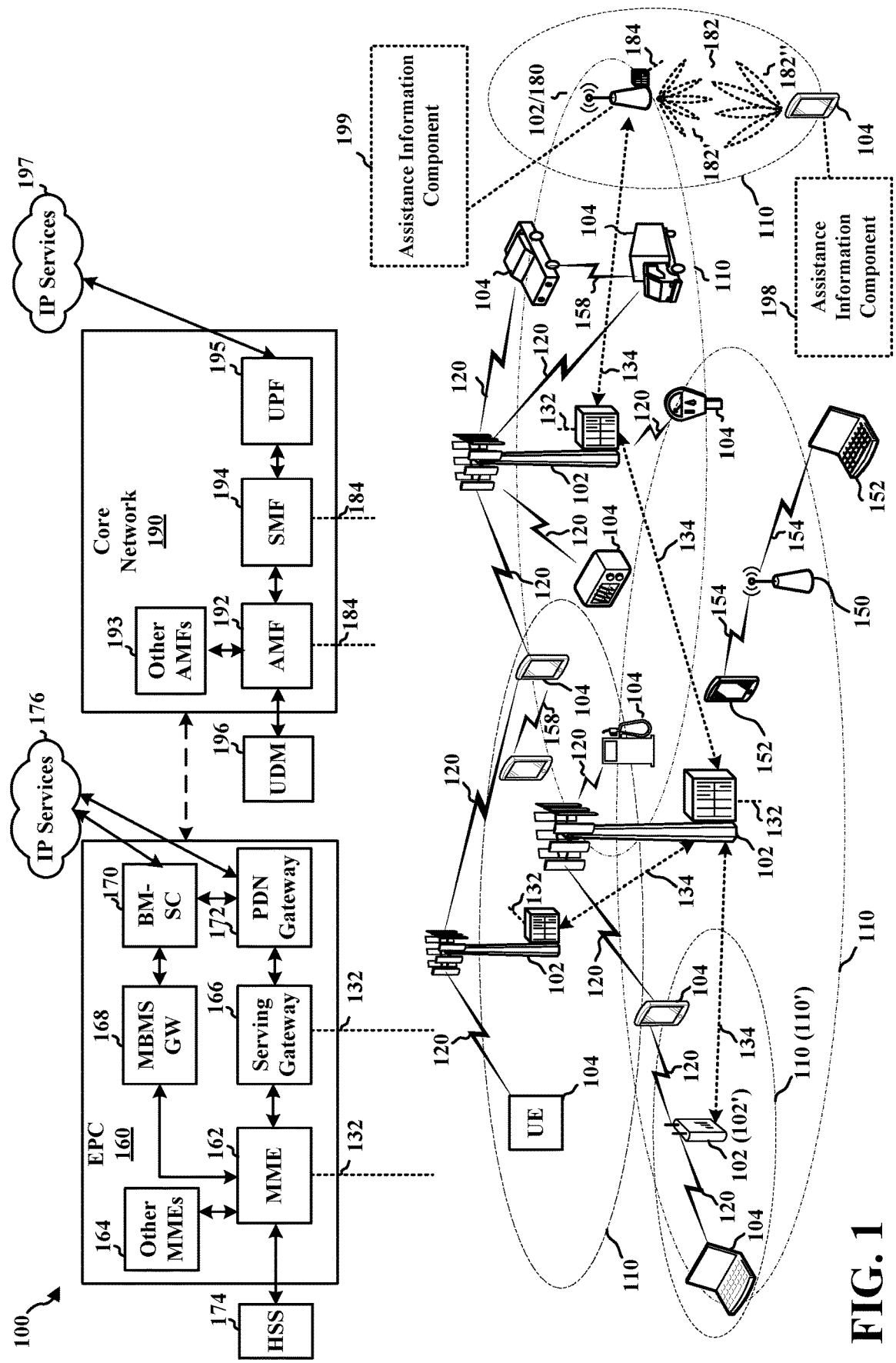
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A network may control many aspects of the radio configurations for a UE. However, a UE has a better understanding of various factors than the base station. For example, the UE is aware of a power status, e.g., including an anticipated battery life. The UE is also aware of user changes to power preferences, e.g., when a user switches to a low power mode in a user menu at the UE. A UE may also be aware that an application is active or is anticipated to be active. Aspects presented herein enable a network to make more effective radio configurations for a particular UE by having the UE share information about the UE, including recommendations and/or preferences, with the base station. For example, the UE may provide recommendations/preferences regarding the UE's preferred radio configurations based on information known at the UE that is not known by the base station. The base station may then determine radio configurations for the UE based on an increased understanding of factors and preferences for the UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., Si interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When a base station 180, such as a gNB, operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an assistance information component 198 configured to transmit UE configuration parameter(s) to base station 102/180 comprising at least one preferred parameter for a UE configuration, e.g., in addition to a preferred setting for a delay budget report and/or to receives a configuration from the base station based, at least in part, on the UE configuration parameter(s) transmitted to the base station 102/180. Similarly, the base station 102/180 may comprise an assistance information component 199 configured to receive UE configuration parameter(s) from UE 104 comprising at least one preferred parameter for a UE configuration, e.g., in addition to a preferred setting for a delay budget report and/or to configure the UE using the UE configuration parameter(s) received from the UE 104. Although examples may be focused on 5G NR, the concepts described herein may be applicable to other similar areas, such as LTE, LTE-A, CDMA, GSM, and other wireless technologies.

Figure 2:
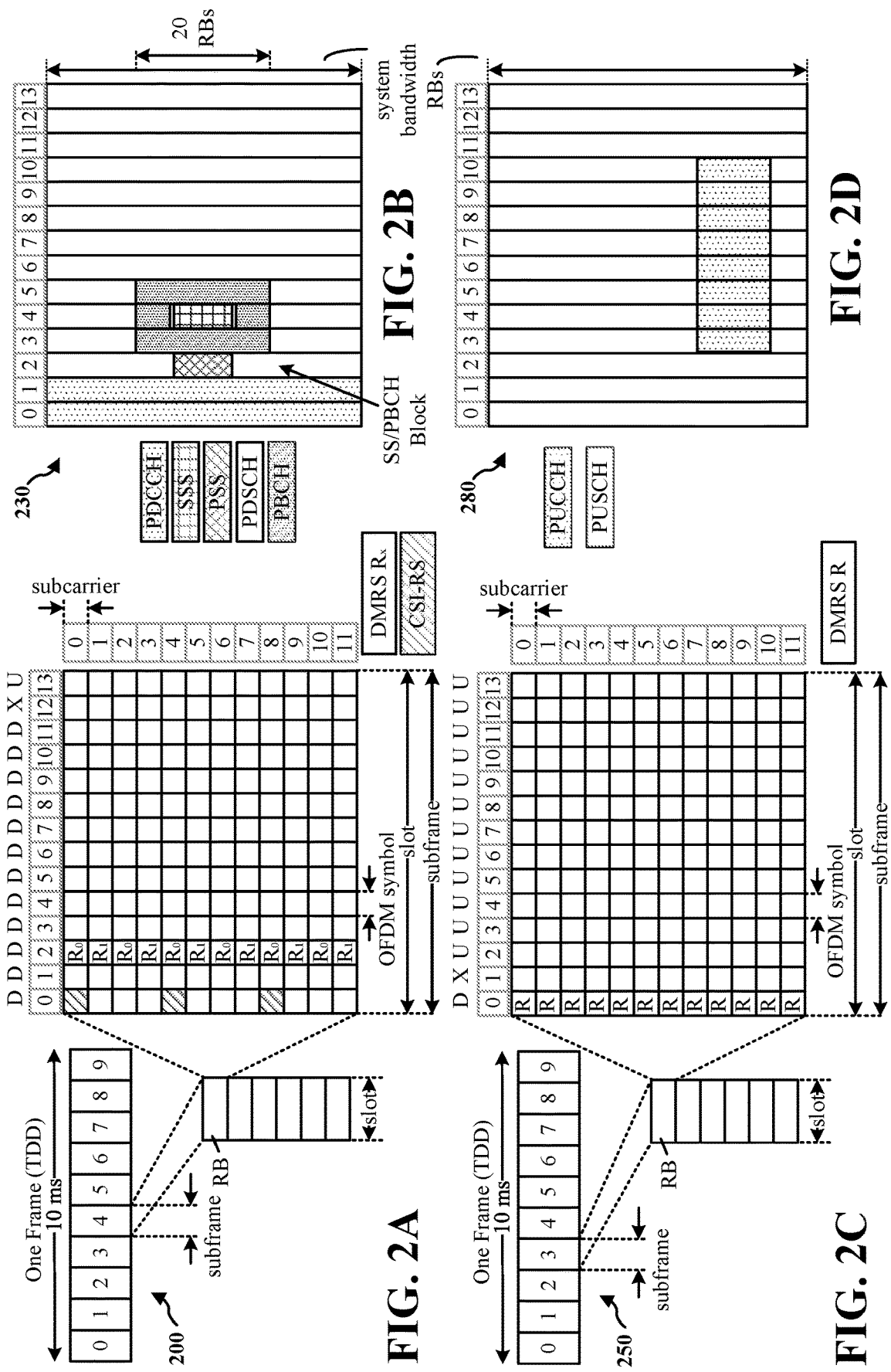
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
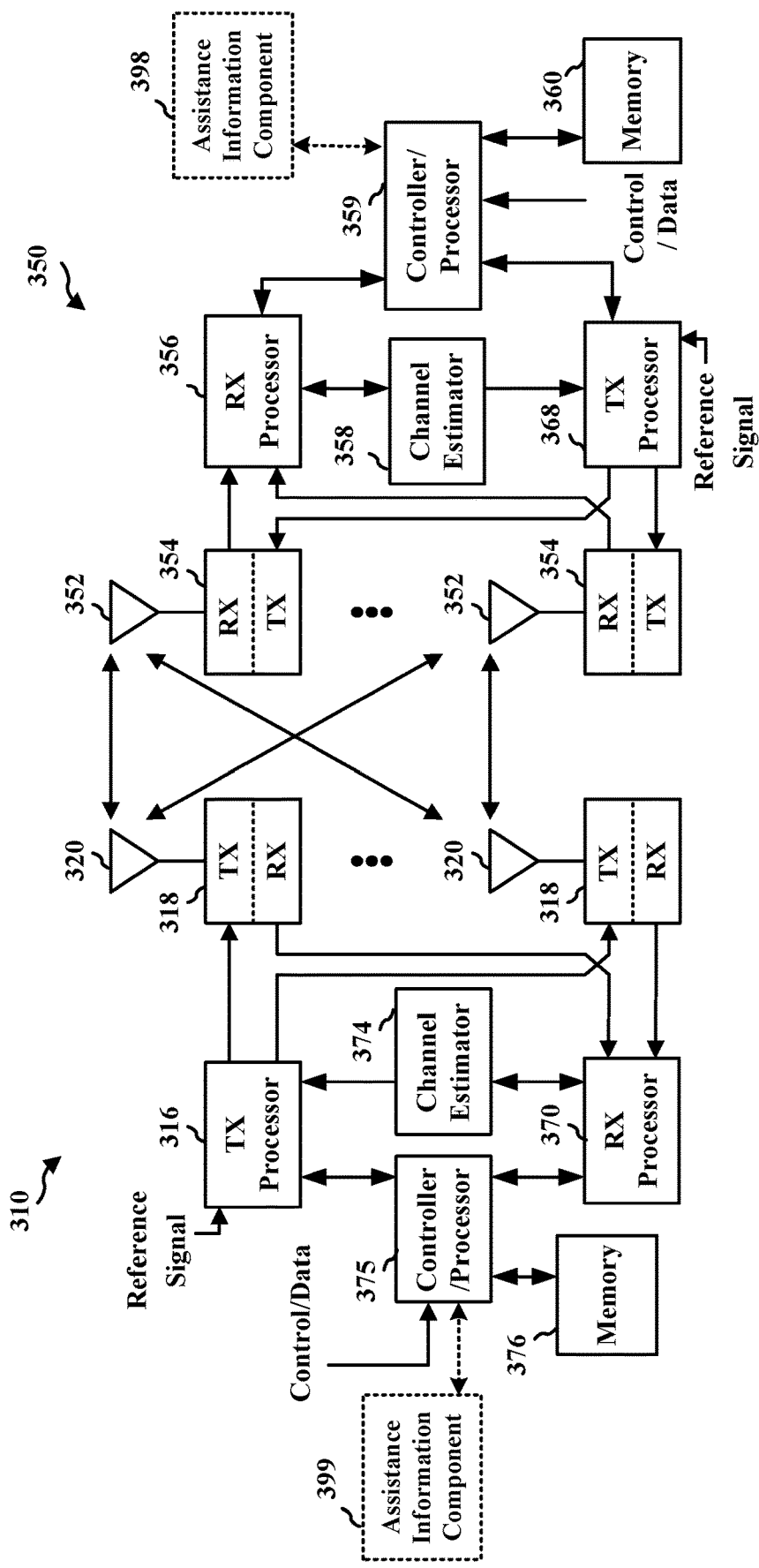
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. In certain aspects, the base station 310 may comprise an assistance information component 399 configured to receive UE configuration parameter(s) from UE 350 comprising at least one preferred parameter for a UE configuration, e.g., in addition to a preferred setting for a delay budget report and/or to configure the UE using the UE configuration parameter(s) received from the UE 350.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. In certain aspects, the UE 350 may include an assistance information component 398 configured to transmit UE configuration parameter(s) to base station 310 comprising at least one preferred parameter for a UE configuration, e.g., in addition to a preferred setting for a delay budget report and/or to receives a configuration from the base station based, at least in part, on the UE configuration parameter(s) transmitted to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A network may control many aspects of the radio configurations for a UE. However, a UE has a better understanding of some factors than the base station. For example, the UE is aware of the UE's power status, e.g., including an anticipated battery life. The UE is also aware of user changes to power preferences, e.g., when a user switches to a low power mode in a user menu at the UE. A UE may also be aware that an application is active or is anticipated to be active. Aspects presented herein enable a network to make more effective radio configurations for a particular UE by having the UE share information about the UE, including recommendations and/or preferences, with the base station. For example, the UE may provide recommendations regarding preferred radio configuration parameters based on information known at the UE that is not known by the base station. The base station may then determine radio configurations for the UE based on an increased understanding of factors and preferences for the UE.

Figure 4:
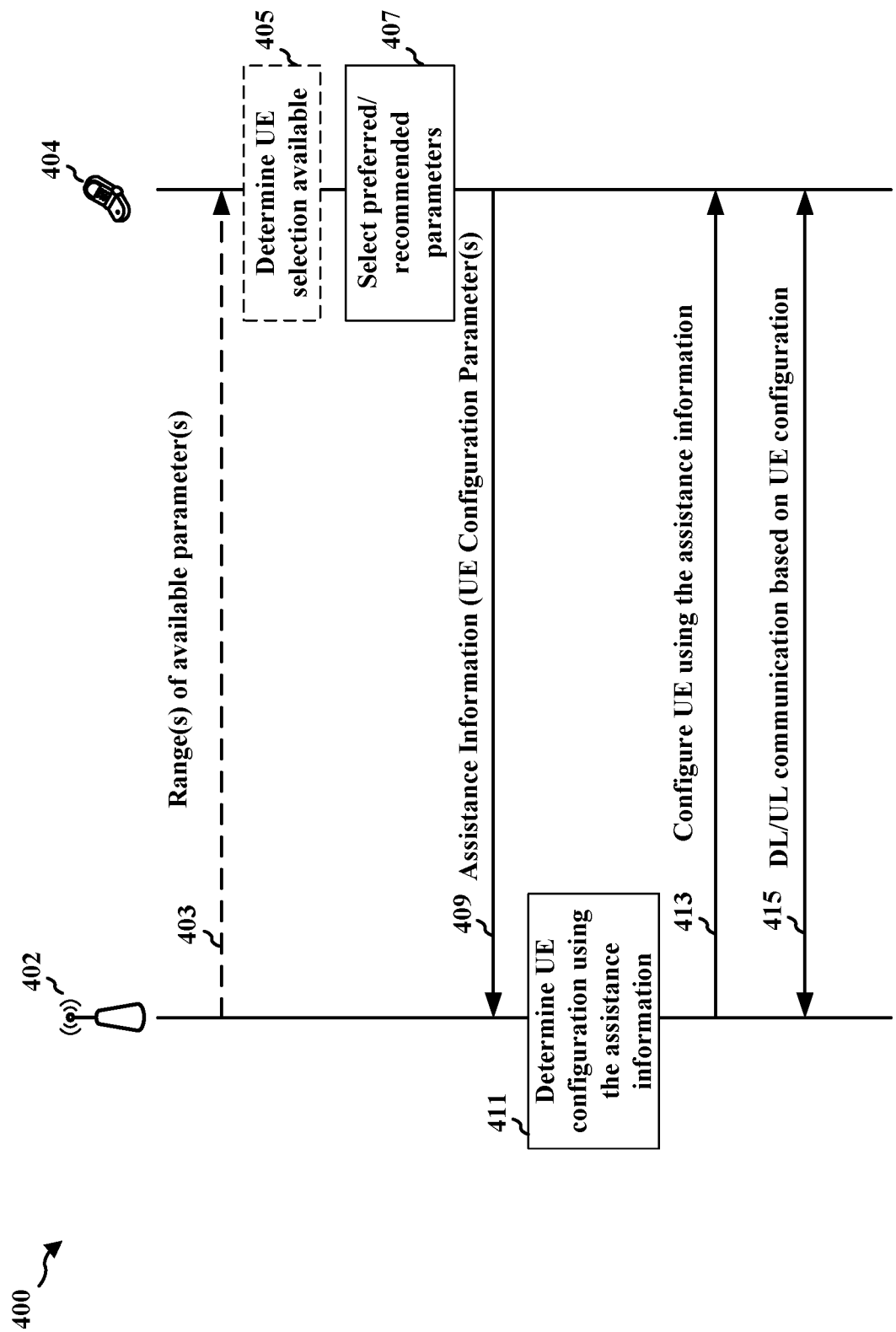
FIG. 4 illustrates an example of communication exchanged between a base station and a UE including transmission of a preferred parameter for a UE configuration to a base station.

FIG. 4 illustrates an example communication flow 400 between a base station 402 and a UE 404 in accordance with the aspects presented herein. As illustrated at 407, the UE 404 may select parameters for radio configurations for the UE. The selection may be based on different purposes. The UE 404 may classify UE configuration parameters into different categories based on different purposes or user preferences. One example purpose may be a power saving purpose. Other examples of purposes may include performance, improved communication, etc. For example, the UE 404 may signal certain DRX parameters when the UE measures traffic patterns and estimates an optimal set of DRX parameters based on the measured traffic. As another example, the UE 404 may signal beam management parameters when the UE 404 will adjust its receiving beam or transmission beam. Thus, the selected parameters may correspond to preferences or recommendations from the UE 404 for UE radio parameters. At 409, the UE may indicate the selected parameters, from 405, to the base station 402. The selected parameters/UE preferences for radio configurations may be referred to as assistance information, such as UE assistance information and may include UE configuration parameter(s). The assistance information may inform the base station that the UE 404 would prefer to prioritize power savings over performance, for example. When a user switches the UE 404 to a lower power mode, which will be followed by the UE component's including the modem, the UE 404 may indicate to the base station a preference for power savings over performance in the UE's radio configurations. As well, based on a power status of the UE 404, the UE 404 may indicate preferences to the base station 402 that will affect power savings. As well, the UE 404 may select the parameters based on a knowledge of which applications are active at the UE 404 and/or will become active at the UE 404.

The UE 404 may provide the assistance information to the base station, such as in an Information Element (IE). For example, the assistance information may be included in a UE Assistance IE (UAI), e.g., in addition to a UE's preferred setting for a delay budget report. The delay budget report may be used by the UE 404 to indicate a UE preferred adjustment to a connected mode DRX coverage enhancement configuration.

There may be various different parameters that a UE 404 may indicate to the base station 402 in the assistance information, e.g. comprised in the UAI. The UE 404 may send its preferred values of each of the parameters to the base station 402, e.g., in a single UAI. In another example, the UE 404 may send a subset of the preferred parameters to the base station 402 in a first UAI. The UE 404 may send another subset of the preferred parameters to the base station 402 in another UAI. The UE 404 may send a single preferred parameter or indication to the base station 402 in the UAI. Thus, the UE 404 may communicate assistance information to the base station 402 in a grouping and order determined by the UE 404.

The base station 402 may use the assistance information, at 411, to determine the radio configurations for the UE 404. The assistance information may be one of various factors considered by the base station 402 in configuring the UE 404. The base station 402 might not be constrained by the preferences indicated to the base station at 409, but may be free to use the information to configure the UE 404 in a more effective manner. As well, the assistance information may indicate to the base station 402 that the UE 404 would prefer to operate using a lower power mode, and the base station 402 may determine the way to achieve the lower power mode through the UE's radio configurations. At 413, the base station 402 may configure the UE 404 with the configuration(s) determined at 411 using the assistance information provided by the UE. The base station 402 and UE 404 may then implement the configuration(s) in communicating with each other. As illustrated at 415, the base station 402 may communicate uplink and/or downlink communication with the UE 404 based on the configuration of the UE at 413.

As illustrated at 403, the base station 402 may broadcast, or otherwise transmit, a range of available parameters for UE selection. For example, rather than broadcasting the range of available parameters, the base station 402 may indicate range(s) of available parameter(s) to the UE 404 in dedicated RRC signaling for the UE 404. Thus, the base station 402 may indicate to the UE 404 the ranges that are possible and/or whether the base station 402 supports the UE selection of preferred radio configuration parameters. The network may determine whether to broadcast the available ranges and may also determine which available ranges to broadcast. For example, a base station 402 may broadcast values of all potential parameters or only a subset of the potential parameters. When a base station 402 does not broadcast the available range(s), it may indicate to the UE 404 that UE selection from among those parameter is not supported by the base station 402. Thus, at 405, the UE 404 may determine whether or not UE selection/recommendation of assistance information is supported by the base station 402 based on whether or not the UE 404 receives an indication of the range(s) of available parameter(s) from the base station. When the UE 404 does not receive any range(s) of available parameter(s) from the base station 402, the UE 404 may determine that the UE does not support the UE selection of preferred parameter values. Thus, the UE 404 may refrain from selecting preferred values and may refrain from sending assistance information to the base station 402.

If the UE 404 receives the range(s) of available parameter(s) from the base station 402, at 403, the UE may select, at 407, a value from among the available ranges indicated by the base station 402. Thus, the UE 404 may send back to the base station 402, in the assistance information 409, an indication of a value/parameter selected from among the range of available parameter(s) broadcast by the base station 402. The UE 404 may use an index comprised in a message to the base station 402 to indicate the selected value from within the available range(s). For example, the index may be comprised in a UAI. The UE 404 may send back an index for each parameter for which the base station 402 provided an available range. The UE 404 may send back indexes for a subset of parameters for which the base station 402 provided available ranges. The UE 404 may even send back an index for a single parameter from among the parameters for which the base station 402 provided available ranges. The UE 404 may determine for which parameters from a plurality of possible parameters, the UE 404 will provide assistance information to the base station 402.

The assistance information 409 provided by the UE 404 to the base station 402 may comprise preferences/recommendation regarding any of various parameters that affect a UE's radio configuration(s). For example, the indicated parameters may comprise any combination of parameters related to the UE's DRX configuration, parameters related to the UE's bandwidth configuration, parameters related to a data channels for the UE 404, parameters related to a control channel for the UE 404, parameters related to beam management for the UE 404, and/or parameters related to the UE's power status.

For example, the indicated parameters may comprise any combination of parameters related to the UE's DRX configuration, such as a DRX on duration, a DRX inactivity timer, a DRX long cycle, a DRX short cycle, a DRX short cycle timer, a DRX slot offset, an average data rate for traffic for the UE 404, an average Transport Block (TB) size for traffic for the UE 404, or an average burst duration for traffic for the UE 404, among other examples. Such parameters related to the UE's DRX configuration may be sent in addition to, or separately from, a delay budget report that may indicate a UE preference to adjust to a connected mode DRX or a coverage enhancement configuration. For example, the delay budget report may indicate that the UE 404 would prefer to transition to a long DRX cycle. The assistance information presented herein may provide different/additional parameters relating to a UE's DRX configuration. For example, by providing information about preferences or recommendations for the UE's DRX configuration, the UE 404 may indicate to the base station 402 whether the UE 404 is prioritizing power savings or performance. The base station 402 may then configure the UE 404 for DRX, e.g., at 413, with an understanding of which aspect the UE 404 considers more important at the time. The base station 402 may use at least one of the indicated parameters in configuring the UE 404 for DRX, or the base station 402 may adjust a DRX parameter based on the assistance information from the UE 404.

As another example, the indicated parameters may comprise any combination of parameters related to the UE's bandwidth configurations. For example, the UE may indicate to the base station a preference or recommendation for aggregated bandwidth across all serving cells for the UE 404, such as for serving cells for different carrier types. The UE 404 may indicate to the base station 402 a preferred or recommended number of downlink carriers and/or uplink carriers for the UE 404. The UE 404 may indicate to the base station 402 a preference/recommendation about a carrier type, e.g., for carrier selection between FR1 and FR2. The base station 402 may determine a bandwidth configuration for the UE 404 using the indicated bandwidth preferences from the UE 404. The base station 402 may use at least one of the indicated parameters in the bandwidth configuration for the UE 404, or the base station 402 may adjust a parameter of the UE's bandwidth configuration based on the assistance information from the UE 404.

As another example, the indicated parameters may comprise any combination of parameters related to a data channel for the UE, such as PUSCH and/or PDSCH for the UE 404. For example, the UE 404 may indicate a preference or recommendation about a maximum TB size that the UE 404 can handle in PUSCH and/or PDSCH. The base station 402 may determine a configuration for the UE 404 for PUSCH/PDSCH based on the assistance information provided by the UE 404, e.g., for communication based on a TB size that does not exceed the maximum indicated by the UE 404.

As another example, the indicated parameters may comprise any combination of parameters related to a control channel for the UE 404, e.g., PDCCH for the UE 404. The UE 404 may indicate a preference/recommendation for a particular TDD pattern for PDCCH. The UE 404 may indicate a preference/recommendation for a particular periodicity for PDCCH monitoring. A higher monitoring periodicity may require larger amounts of power at the UE 404. The UE 404 may indicate a preference/recommendation for HARQ feedback from the UE 404, e.g., information about a HARQ processing timeline. The base station 402 may determine a configuration for the UE 404 for PDCCH based on the assistance information provided by the UE 404, e.g., by selecting the TDD pattern, monitoring periodicity, and/or HARQ parameters using the assistance information provided by the UE 404.

As another example, the indicated parameters may comprise any combination of parameters related to beam management for the UE 404. For example, the UE 404 may indicate a preference/recommendation for an antenna panel at the UE 404 and/or the base station 402, e.g., an antenna panel or a subset of antenna panels from among a plurality of possible antenna panels. The UE 404 may indicate a preference/recommendation for mobility parameters for the UE 404. The UE 404 may indicate information about the UE 404 that may be helpful to the base station 402 in performing beam management. The UE 404 may provide a trajectory of movement of the UE 404 that may assist the base station 402 in selecting beams to use to transmit and/or receive communication with the UE 404, e.g., as described in connection with 182 in FIG. 1. The base station 402 may determine beam management configurations based on the assistance information provided by the UE 404, e.g., with beam selection using the assistance information from the UE 404 regarding antenna panel(s) and/or mobility parameters for the UE 404.

As another example, the indicated parameters may comprise any combination of parameters related to the UE's power status. For example, the assistance information may indicate a battery level for the UE 404. The battery level may help the base station 402 to understand whether battery savings are important for the UE 404 when determining radio configurations for the UE 404. The assistance information may indicate a modem thermal level for the UE 404. If the modem has a temperature above a certain level, the base station 402 may determine that the UE 404 would benefit from a lower power mode that would decrease activity and the UE's modem in order to help reduce the temperature of the modem. The assistance information may indicate a power preference indication. This may enable the UE 404 to communicate a power preference to the base station 402, e.g., whether the UE 404 prefers a normal mode or a lower power mode, using a binary indication. The base station 402 may use the UE's indication to determine whether to configure the UE 404 to communicate using lower power configuration parameters.

Figure 5:
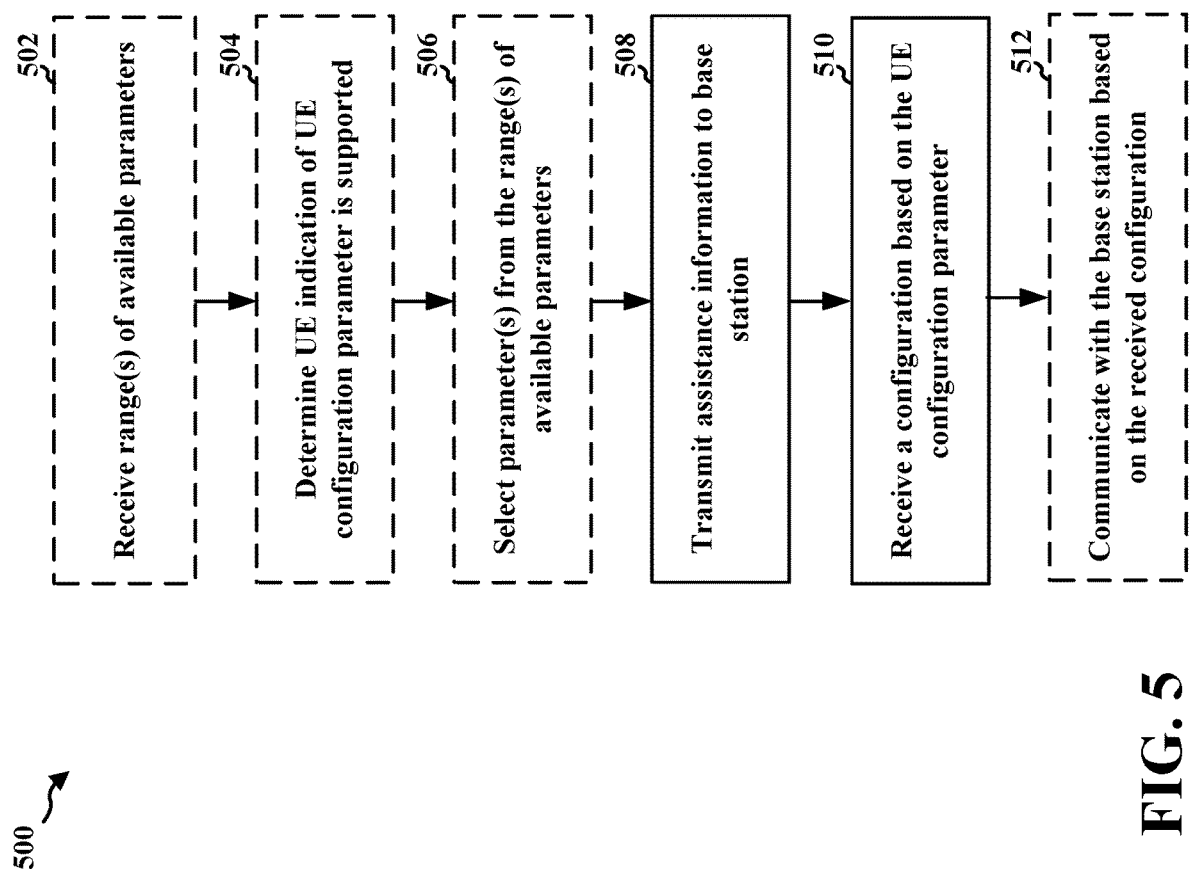
FIG. 5 is a flowchart of a method of wireless communication including transmission of a preferred parameter for a UE configuration to a base station.

FIG. 5 is a flowchart 500 of a method of wireless communication. The method may be performed by a UE or a component of a UE (such as UE 104, 350, 404, 950; the apparatus 602, 602'; the processing system 1114, which may include memory and which may be an entire UE 350 or a component of a UE 350, such as the TX processor 368, the RX processor 356, and/or the controller/processor 359). Optional aspects are illustrated with a dashed line. The method enables more effective configurations for a UE by having the UE provide assistance information to the base station that can be used by the base station to configured the UE.

At 508, the UE transmits at least one UE configuration parameter to a base station comprising at least one preferred parameter for a UE configuration, e.g., a described in connection with 409 in FIG. 4. For example, the UE configuration parameter may be transmitted, e.g., by the assistance information component 614 of the apparatus 602 in FIG. 6. The UE configuration parameter(s) may be indicated by the UE in an IE to the base station. For example, the UE configuration parameter(s) may be indicated in a UAI, e.g., in addition to a preferred setting for a delay budget report that indicates whether the UE prefers a long DRX mode.

The UE configuration parameter(s) may comprise an indication for a preferred parameter for at least one of a DRX on duration, a DRX inactivity timer, a DRX long cycle, a DRX short cycle, a DRX short cycle timer, a DRX slot offset, an average data rate, an average transport block size, or an average burst duration. For example, the UE configuration parameter(s) may comprise an indication for a preferred bandwidth configuration for the UE, e.g., indicating at least one of an aggregated bandwidth across serving cells for different types of carriers, a downlink/uplink bandwidth part index for a serving cell, a number of uplink carriers, a number of downlink carriers. The UE configuration parameter(s) may comprise an indication for a preferred data channel parameter, e.g., indicating a maximum transport block size for a downlink data channel or an uplink data channel. The UE configuration parameter(s) may comprise an indication for a preferred control channel parameter, e.g., comprising at least one of a TDD pattern, a control channel monitoring periodicity, or a processing timeline related to feedback processing. The UE configuration parameter(s) may comprise an indication for a beam management parameter, e.g., comprising at least one of a preferred antenna panel, a preferred beam, information about a trajectory of the UE, or a mobility parameter for the UE. The UE configuration parameter(s) may indicate power status information for the UE, e.g., at least one of a battery level, a thermal level of a modem, or an indication of a power preference for the UE.

At 510, the UE receives a configuration from the base station based, at least in part, on the UE configuration parameter(s) transmitted to the base station. The configuration may be received, for example, by the configuration component 616 of the apparatus 602 in FIG. 6. As described in connection with FIG. 4, the UE configuration parameter(s) may inform the base station about preferred parameters at the UE, e.g., for a power savings, for higher performance, etc. The base station may determine the manner in which the desired result will be achieved and may configure the UE accordingly. The base station may use a particular parameter indicated in the UE configuration parameter(s) from the UE or may use the UE configuration parameter(s) to determine/adjust an existing parameter determined by the base station. Thus, the network may configure a set of parameters for a UE, and during operation, a UE may suggest preferred values for the parameters.

As illustrated at 512, the UE may use the configuration from the base station to communicate with the base station, e.g., to transmit uplink communication and/or to receive downlink communication. For example, in the apparatus 602 in FIG. 6, the uplink communication may be transmitted by the transmission component 606 using the configuration, or downlink communication may be received by the reception component 604 using the configuration.

As illustrated at 502, the UE may receive a range of available parameters from the base station, e.g., as described in connection with 403. The range of available parameters may be received, e.g., by the range component 608 of the apparatus 602 in FIG. 6. The range of available parameters may be received in a broadcast from the base station. In another example, the range of available parameters may be received in a dedicated RRC signaling for the UE. The UE may then select a parameter for the UE configuration parameter(s), at 506, from among the range of available parameters received from the base station, e.g., as described in connection with 407 in FIG. 4. For example, the selection component 612 of the apparatus 602 in FIG. 6 may perform the selection. The UE configuration parameter(s) may comprise an index corresponding to a value selected from among the range of available parameters received from the base station. In another example in which the UE does not receive a range of available parameter from the base station, at 502, the selection of parameters, at 506, may be made independently by the UE or in another manner.

The broadcast, or other signaling, of ranges of available parameters from a base station may be used by the UE to determine whether the base station supports UE selection of the parameters. Thus, at 504, the UE may determine that UE indication of the UE configuration parameter(s) is supported by the base station based on receiving the range of available parameters from the base station, e.g., as described in connection with 405 in FIG. 4. For example, the determination component 610 of the apparatus 602 in FIG. 6 may perform the determination.

Figure 6:
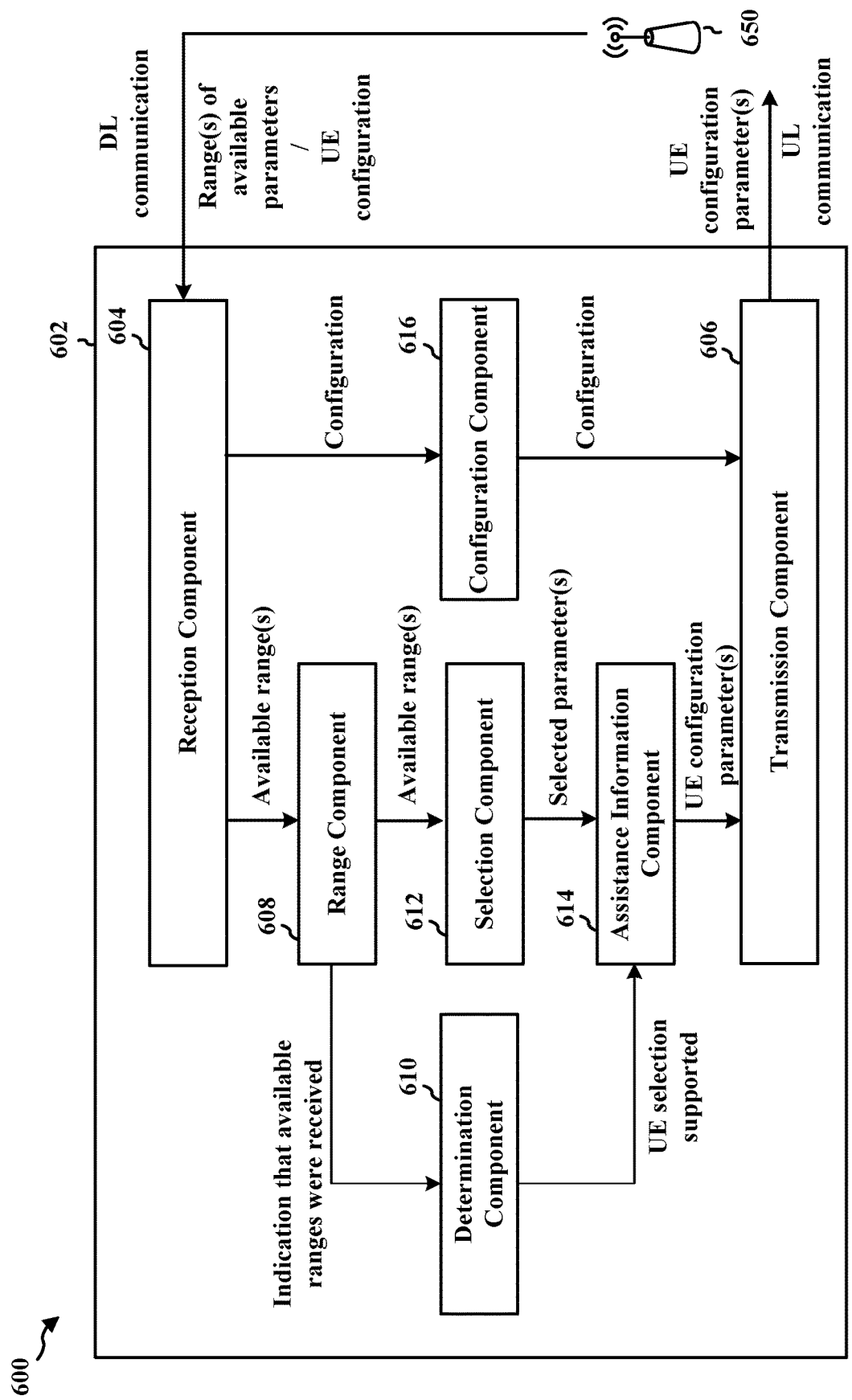
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a UE or a component of a UE in communication with a base station 650. The apparatus includes a reception component 604 that receives downlink communication from base station 650 and a transmission component 606 that transmits uplink communication to the base station 650. The apparatus may include an assistance information component 614 configured to transmit UE configuration parameter(s) to a base station comprising at least one preferred parameter for a UE configuration, e.g., in addition to a preferred setting for a delay budget report, as described in connection with 409, 508. The apparatus may include a configuration component 616 configured to receive a configuration from the base station based, at least in part, on the UE configuration parameter(s) transmitted to the base station, as described in connection with 413, 510. The apparatus may include a range component 608 configured to receive a range of available parameters from the base station, e.g., as described in connection with 403, 502. The apparatus may include a selection component 612 configured to select a parameter for the UE configuration parameter(s) from among the range of available parameters received from the base station, as described in connection with 407, 506. The apparatus may include a determination component 610 configured to determine that UE indication of the UE configuration parameter(s) is supported by the base station based on receiving the range of available parameters from the base station, e.g., as described in connection with 405, 504. The apparatus may communicate, using the reception component 604 and/or transmission component 606, based on the configuration received from the base station.

The apparatus 602 may include additional components that perform each of the blocks of the algorithm in the aforementioned flowchart of FIG. 5 and aspects of the communication flow in FIG. 4. As such, each block in the aforementioned flowchart of FIG. 5 and aspects of the communication flow in FIG. 4 may be performed by a component and the apparatus 602 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
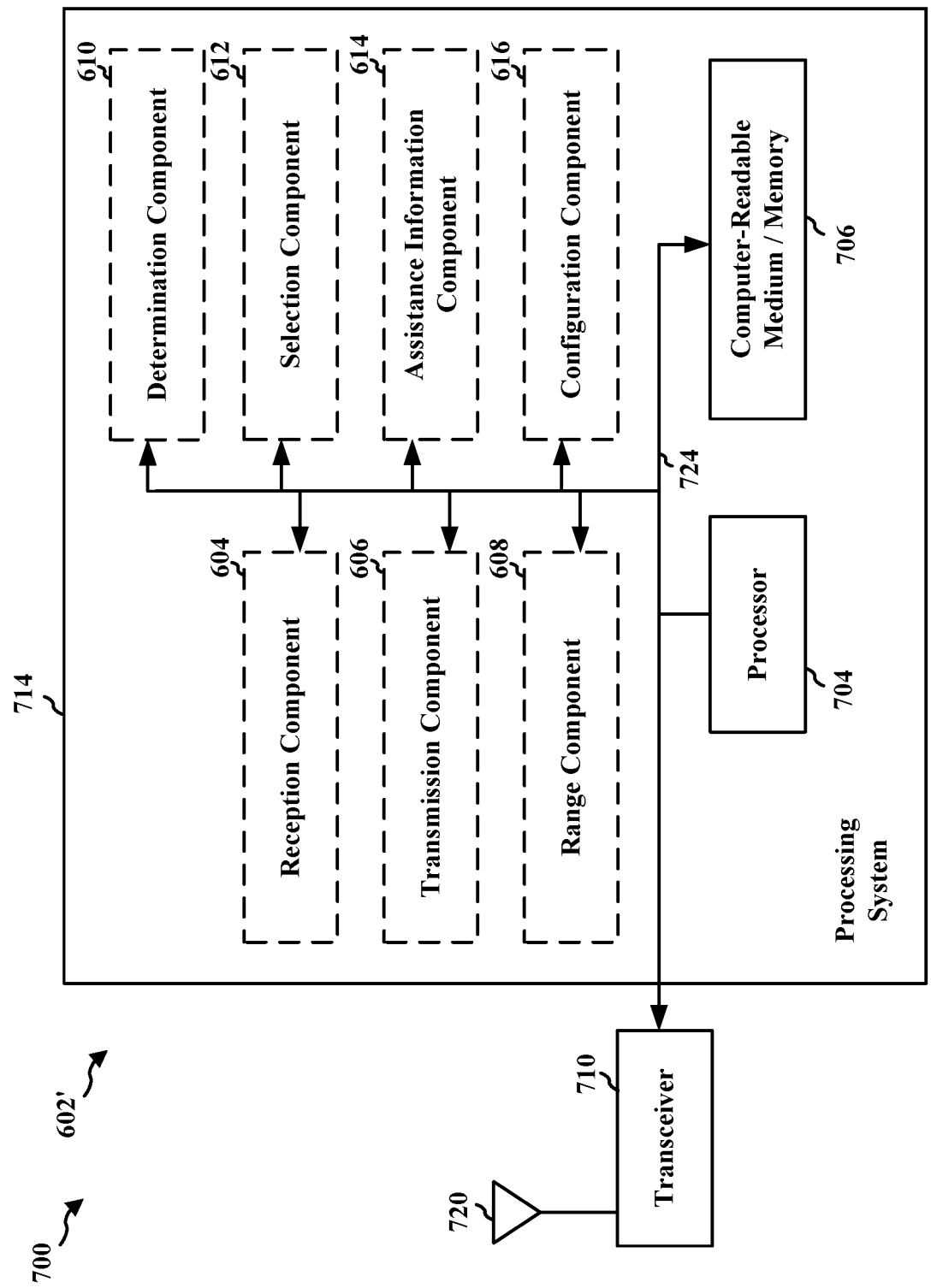
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 613, 616, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 606, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 613, 616. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for transmitting at least one UE configuration parameter to a base station comprising at least one preferred parameter for a UE configuration, e.g., in addition to a preferred setting for a delay budget report (e.g., at least assistance information component 614); and means for receiving a configuration from the base station based, at least in part, on the UE configuration parameter(s)transmitted to the base station (e.g., at least configuration component 616). The apparatus may include means for receiving a range of available parameters from the base station (e.g., at least range component 608). The apparatus may include means for selecting a parameter for the UE configuration parameter(s) from among the range of available parameters received from the base station (e.g., at least selection component 612). The apparatus may include means for determining that UE indication of the UE configuration parameter(s) is supported by the base station based on receiving the range of available parameters from the base station (e.g., at least determination component 610). The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
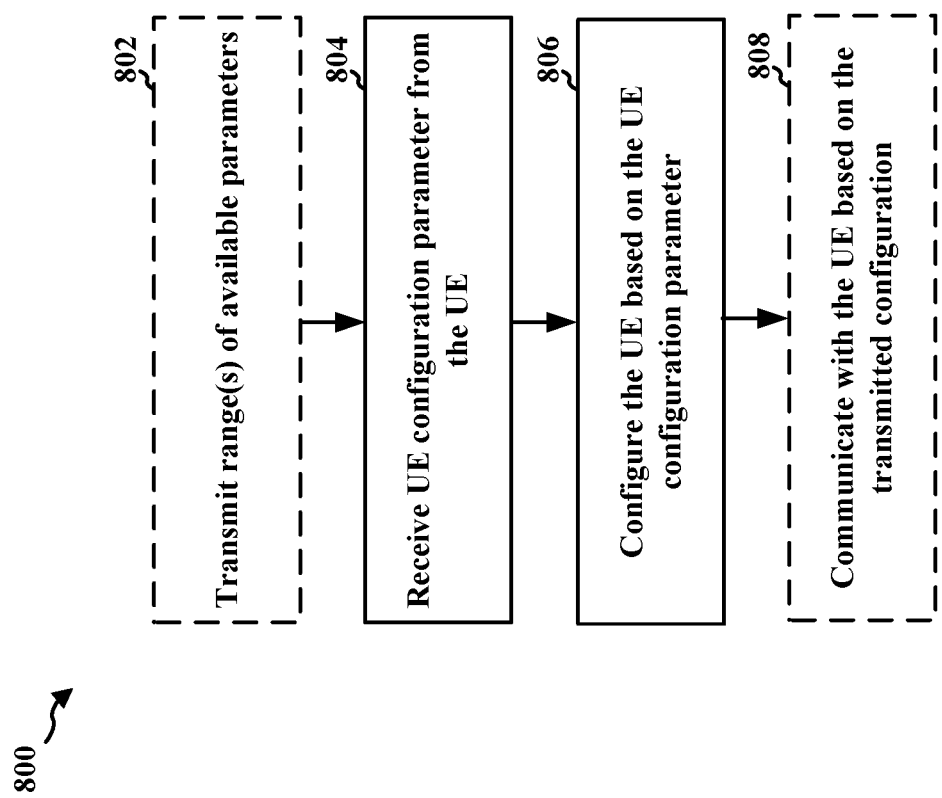
FIG. 8 is a flowchart of a method of wireless communication including receipt of a preferred parameter for a UE configuration.

FIG. 8 is a flowchart 800 of a method of wireless communication. The method may be performed by a base station or a component of a base station (e.g., base station 102, 180, 310, 402, 650, the apparatus 902, 902'; the processing system 1014, which may include memory and which may be an entire base station 310 or a component of a base station 310, such as the TX processor 316, the RX processor 370, and/or the controller/processor 375) in communication with a UE. Optional aspects are illustrated with a dashed line. The method enables more effective configurations for a UE by having the UE provide assistance information, e.g., including UE configuration parameter(s), to the base station that can be used by the base station to configured the UE.

At 804, the base station receives at least one UE configuration parameter from a UE, the UE configuration parameter(s) comprising at least one preferred parameter for a UE configuration, e.g., a described in connection with 409 in FIG. 4. The reception of the UE configuration parameter may be performed, for example, by the assistance information component 908 of the apparatus 902 in FIG. 9, for example. The UE configuration parameter(s) may be received by the base station in an IE from the UE. For example, the UE configuration parameter(s) may be indicated in a UAI, e.g., in addition to a preferred setting for a delay budget report that indicates whether a UE prefers a long DRX mode.

The UE configuration parameter(s) may comprise an indication for a preferred parameter for at least one of a DRX on duration, a DRX inactivity timer, a DRX long cycle, a DRX short cycle, a DRX short cycle timer, a DRX slot offset, an average data rate, an average transport block size, or an average burst duration. For example, the UE configuration parameter(s) may comprise an indication for a preferred bandwidth configuration for the UE, e.g., indicating at least one of an aggregated bandwidth across serving cells for different types of carriers, a downlink/uplink bandwidth part index for a serving cell, a number of uplink carriers, a number of downlink carriers, or a carrier type. The UE configuration parameter(s) may comprise an indication for a preferred data channel parameter, e.g., indicating a maximum transport block size for a downlink data channel or an uplink data channel. The UE configuration parameter(s) may comprise an indication for a preferred control channel parameter, e.g., comprising at least one of a TDD pattern, a control channel monitoring periodicity, or a processing timeline related to feedback processing. The UE configuration parameter(s) may comprise an indication for a beam management parameter, e.g., comprising at least one of a preferred antenna panel, a preferred beam, information about a trajectory of the UE, or a mobility parameter for the UE. The UE configuration parameter(s) may indicate power status information for the UE, e.g., at least one of a battery level, a thermal level of a modem, or an indication of a power preference for the UE.

At 806, the base station configures the UE based, at least in part, on the UE configuration parameter(s) received from the UE. The configuration may be performed, e.g., by the configuration component 910 of the apparatus 902 in FIG. 9.

As described in connection with FIG. 4, the UE configuration parameter(s) may inform the base station about preferred parameters at the UE, e.g., for a power savings, for higher performance, etc. The base station may determine the manner in which the desired result will be achieved and may configure the UE accordingly. The base station may use a particular parameter indicated in the UE configuration parameter(s) from the UE or may use the UE configuration parameter(s) to determine/adjust an existing parameter determined by the base station. Thus, the network may configure a set of parameters for a UE, and during operation, a UE may suggest preferred values for the parameters.

As illustrated at 808, the base station may use the UE's configuration to communicate with the UE, e.g., to transmit downlink communication and/or to receive uplink communication. For example, in the apparatus 902 in FIG. 9, the downlink communication may be transmitted by the transmission component 906 using the configuration using the UE's configuration, or uplink communication may be received by the reception component 604 using the UE's configuration.

As illustrated at 802, the UE may transmit a range of available parameters from the base station, and the UE configuration parameter(s) may comprise a parameter selected from among the range of available parameters received from the base station, e.g., as described in connection with 403 and 407 in FIG. 4. The range of parameters may be transmitted, e.g., by the range component 912 of the apparatus 902 in FIG. 9. The range of available parameters may be broadcast from the base station. In another example, the base station may indicate the range of available parameters to the UE in dedicated RRC signaling for the UE. The UE configuration parameter(s) from the UE may comprise an index corresponding to a value selected from among the range of available parameters transmitted from the base station, at 802. In another example in which the base station does not transmit a range of available parameter 802, the selection of parameters, at 506, may be made independently by the UE. The presence or absence of a broadcast of ranges of available parameters from a base station may indicate to the UE whether the base station supports UE selection of the parameters.

Figure 9:
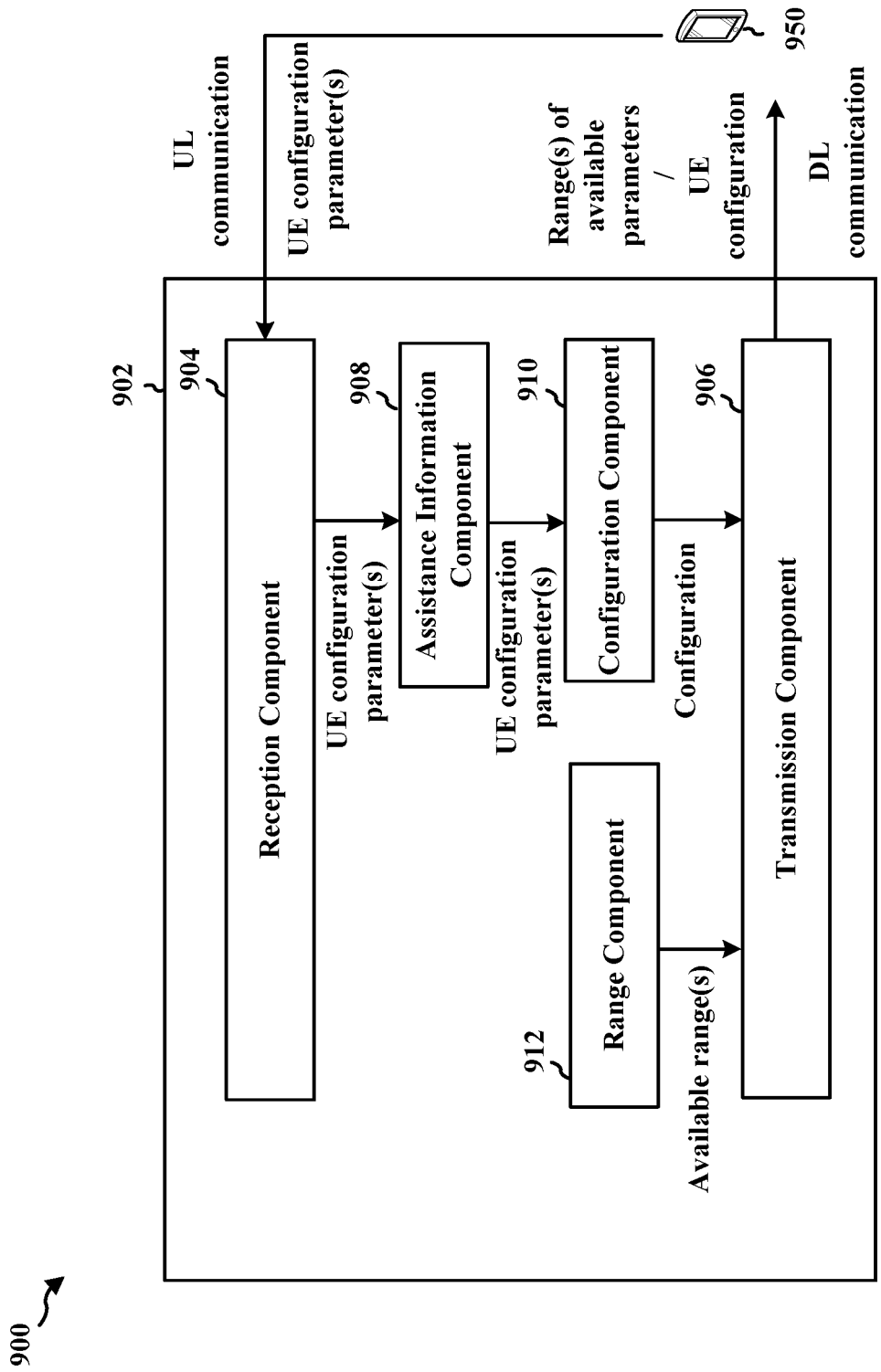
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station or a component of a base station in communication with a UE 950. The apparatus includes a reception component 904 that receives uplink communication from UE 950 and a transmission component 906 that transmits downlink communication to the UE 950. The apparatus may include an assistance information component 908 configured to receive at least one UE configuration parameter from UE 950 comprising at least one preferred parameter for a UE configuration, e.g., in addition to a preferred setting for a delay budget report, e.g., as described in connection with 409, 804. The apparatus may include a configuration component 910 configured to configure the UE using the UE configuration parameter(s) received from the UE, e.g., as described in connection with 411, 413, and 806. The apparatus may include a range component 912 configured to transmit a range of available parameters from the base station, wherein the UE configuration parameter(s) comprises a parameter selected from among the range of available parameters received from the base station, e.g., as described in connection with 403, 802. The reception component 904 and/or transmission component 906 may be configured to communicate with the UE 950 based on the configuration configured by the configuration component 910.

The apparatus may include additional components that perform each of the blocks of the algorithm in the aforementioned flowchart of FIG. 8 and aspects of the communication flow in FIG. 4. As such, each block in the aforementioned flowchart of FIG. 8 and the communication flow in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
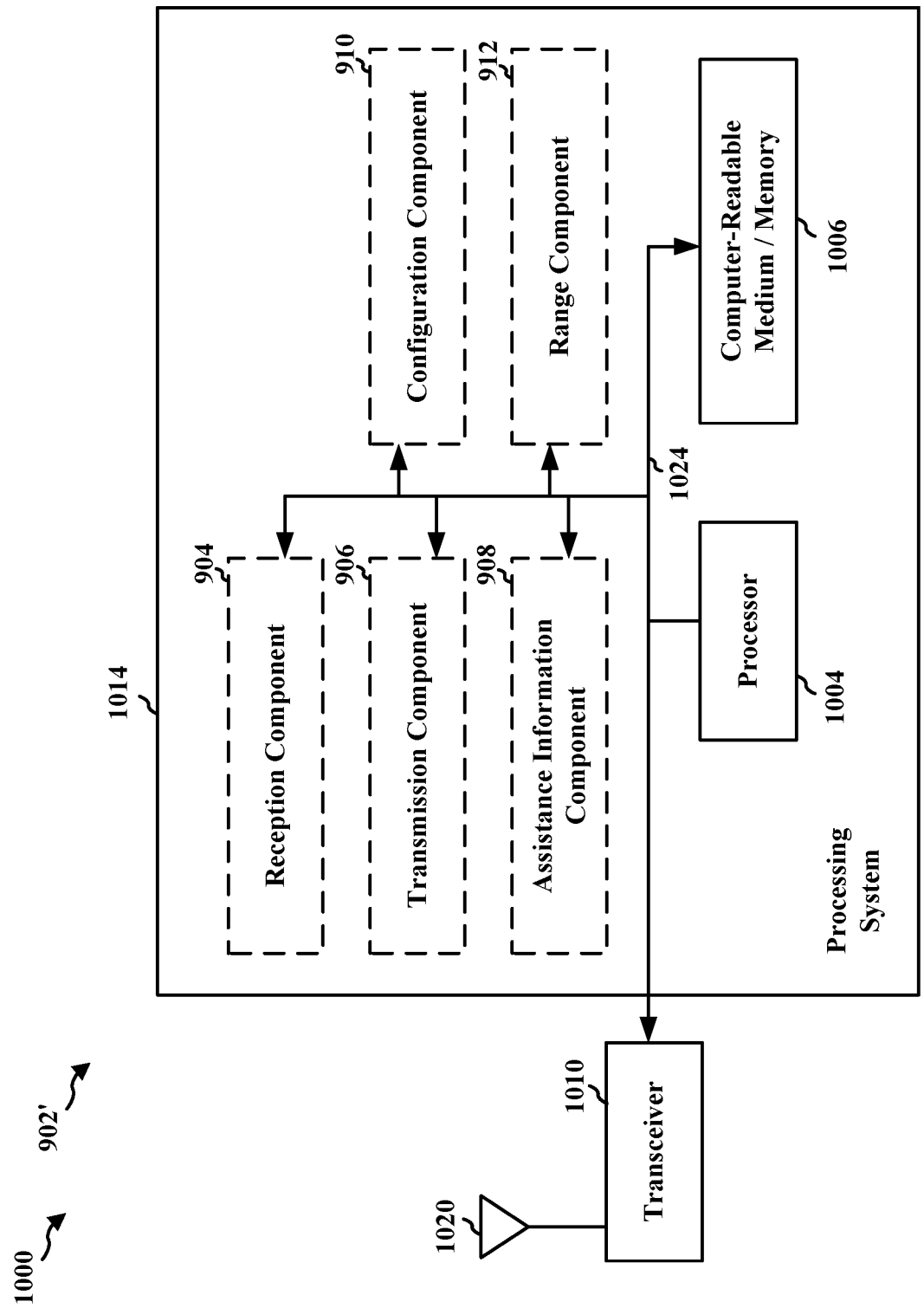
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see base station 310).

In one configuration, the apparatus 902/902' for wireless communication includes means for receiving at least one UE configuration parameter from a UE comprising at least one preferred parameter for a UE configuration, e.g., in addition to a preferred setting for a delay budget report (e.g., at least assistance information component 908); and means for configuring the UE using the UE configuration parameter(s) received from the UE (e.g., at least configuration component 910). The apparatus may include means for transmitting a range of available parameters from the base station, wherein the UE configuration parameter(s) comprises a parameter selected from among the range of available parameters received from the base station (e.g., at least range component 912). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other implementations or teachings described herein, without limitation.

Example 1 is a method of wireless communication at a UE, comprising: transmitting at least one UE configuration parameter to a base station comprising at least one preferred parameter for a UE configuration; and receiving a configuration from the base station based, at least in part, on the at least one UE configuration parameter transmitted to the base station.

In Example 2, the method of Example 1 further includes that the at least one UE configuration parameter comprises an indication for a preferred parameter for at least one of a DRX long cycle, a DRX short cycle, a DRX inactivity timer, or a DRX short cycle timer.

In Example 3, the method of Example 1 or 2 further includes that the at least one UE configuration parameter comprises an indication for a preferred parameter for at least one of a DRX on duration or a DRX slot offset.

In Example 4, the method of any of Examples 1-3 further includes that the at least one UE configuration parameter is indicated in an IE.

In Example 5, the method of any of Examples 1-4 further includes that the at least one UE configuration parameter is indicated in a UE Assistance IE (UAI) in addition to a preferred setting for a delay budget report.

In Example 6, the method of any of Examples 1-5 further includes that the at least one UE configuration parameter comprises an indication for a preferred discontinuous reception parameter including at least one of an average data rate, an average transport block size, or an average burst duration.

In Example 7, the method of any of Examples 1-6 further includes that the at least one UE configuration parameter comprises an indication for a preferred bandwidth configuration for the UE, wherein the indication indicates at least one of an aggregated bandwidth across serving cells for different types of carriers, a downlink/uplink bandwidth part index for a serving cell, a number of uplink carriers, a number of downlink carriers.

In Example 8, the method of any of Examples 1-7 further includes that the at least one UE configuration parameter comprises an indication for a preferred data channel parameter, wherein the indication indicates a maximum transport block size for a downlink data channel or an uplink data channel.

In Example 9, the method of any of Examples 1-8 further includes that the at least one UE configuration parameter comprises an indication for a preferred control channel parameter, wherein the preferred control channel parameter comprises at least one of a TDD pattern, a control channel monitoring periodicity, or processing timeline related to feedback processing.

In Example 10, the method of any of Examples 1-9 further includes that the at least one UE configuration parameter comprises an indication for a beam management parameter, wherein the beam management parameter comprises at least one of a preferred antenna panel, a preferred beam, information about a trajectory of the UE, or a mobility parameter for the UE.

In Example 11, the method of any of Examples 1-10 further includes that the at least one UE configuration parameter indicates power status information for the UE, wherein the power status information comprises at least one of a battery level, a thermal level of a modem, or an indication of a power preference for the UE.

In Example 12, the method of any of Examples 1-11 further includes receiving a range of available parameters from the base station; and selecting a parameter for the at least one UE configuration parameter from among the range of available parameters received from the base station.

In Example 13, the method of any of Examples 1-12 further includes that the range of available parameters is received in a broadcast from the base station or is received in a dedicated RRC signaling for the UE, and wherein the at least one UE configuration parameter comprises an index corresponding to a value selected from among the range of available parameters received from the base station.

In Example 14, the method of any of Examples 1-13 further includes determining that UE indication of the at least one UE configuration parameter is supported by the base station based on receiving the range of available parameters from the base station.

Example 15 is a device including one or more processors and one or more memories in electronic communication with the one or more processors storing instructions executable by the one or more processors to cause the device to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a base station, comprising: receiving, from a UE, at least one UE configuration parameter comprising at least one preferred parameter for a UE configuration; and configuring the UE using the at least one UE configuration parameter received from the UE.

In Example 19, the method of Example 18 further includes that the at least one UE configuration parameter comprises an indication for a preferred parameter for at least one of a DRX long cycle, a DRX short cycle, a DRX inactivity timer, or a DRX short cycle timer.

In Example 20, the method of Example 18 or 19 further includes that the at least one UE configuration parameter comprises an indication for a parameter for at least one of a DRX on duration or a DRX slot offset.

In Example 21, the method of any of Examples 18-20 further include that the at least one UE configuration parameter is indicated in an IE.

In Example 22, the method of any of Examples 18-21 further include that the at least one UE configuration parameter is indicated in a UAI in addition to a preferred setting for a delay budget report.

In Example 23, the method of any of Examples 18-22 further include that the at least one UE configuration parameter comprises an indication for a preferred discontinuous reception parameter including at least one of an average data rate, an average transport block size, or an average burst duration.

In Example 24, the method of any of Examples 18-23 further include that the at least one UE configuration parameter comprises an indication for a preferred bandwidth configuration for the UE, wherein the indication indicates at least one of an aggregated bandwidth across serving cells for different types of carriers, a downlink/uplink bandwidth part index for a serving cell, a number of uplink carriers, a number of downlink carriers.

In Example 25, the method of any of Examples 18-24 further include that the at least one UE configuration parameter comprises an indication for a preferred data channel parameter, wherein the indication indicates a maximum transport block size for a downlink data channel or an uplink data channel.

In Example 26, the method of any of Examples 18-25 further include that the at least one UE configuration parameter comprises an indication for a preferred control channel parameter, wherein the preferred control channel parameter comprises at least one of a TDD pattern, a control channel monitoring periodicity, or a processing timeline related to feedback processing.

In Example 27, the method of any of Examples 18-26 further include that the at least one UE configuration parameter comprises an indication for a beam management parameter, wherein the beam management parameter comprises at least one of a preferred antenna panel, a preferred beam, information about a trajectory of the UE, or a mobility parameter for the UE.

In Example 28, the method of any of Examples 18-27 further include that the at least one UE configuration parameter indicates power status information for the UE, wherein the power status information comprises at least one of a battery level, a thermal level of a modem, or an indication of a power preference for the UE.

In Example 29, the method of any of Examples 18-28 further include transmitting a range of available parameters from the base station, wherein the at least one UE configuration parameter comprises a parameter selected from among the range of available parameters received from the base station.

In Example 30, the method of any of Examples 18-29 further include that the range of available parameters is broadcast from the base station or is transmitted in a dedicated RRC signaling for the UE.

In Example 31, the method of any of Examples 18-30 further include that the at least one UE configuration parameter comprises an index corresponding to a value selected from among the range of available parameters transmitted from the base station.

Example 32 is a device including one or more processors and one or more memories in electronic communication with the one or more processors storing instructions executable by the one or more processors to cause the device to implement a method as in any of Examples 18-31.

Example 33 is a system or apparatus including means for implementing a method or realizing an apparatus as in any of Examples 18-31

Example 34 is a non-transitory computer readable medium storing instructions executable by one or more processors to cause the one or more processors to implement a method as in any of Examples 18-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   transmitting, to a network entity, UE assistance information including:
      a delay budget report indicating a preference to adjust a connected mode discontinuous reception (DRX) configuration; and
      an indication of at least one preferred parameter for a UE configuration for each of a DRX long cycle, a DRX short cycle, a DRX inactivity timer, and a DRX short cycle timer; and
   receiving a DRX configuration from the network entity.

2. The method of claim 1, wherein the UE assistance information further indicates a preferred parameter for at least one of a Discontinuous Reception (DRX) on duration or a DRX slot offset.

3. The method of claim 1, wherein the indication of the at least one preferred parameter is comprised in an Information Element (IE).

4. The method of claim 1, wherein the UE assistance information further indicates a preferred discontinuous reception parameter including at least one of an average data rate, an average transport block size, or an average burst duration.

5. The method of claim 1, wherein the UE assistance information further indicates preferred bandwidth configuration for the UE including at least one of an aggregated bandwidth across serving cells for different types of carriers, a downlink/uplink bandwidth part index for a serving cell, a number of uplink carriers, a number of downlink carriers.

6. The method of claim 1, wherein the UE assistance information further indicates a preferred data channel parameter including a maximum transport block size for a downlink data channel or an uplink data channel.

7. The method of claim 1, wherein the UE assistance information further indicates a preferred control channel parameter including, wherein the preferred control channel parameter comprises at least one of a Time Division Duplex (TDD) pattern, a control channel monitoring periodicity, or processing timeline related to feedback processing.

8. The method of claim 1, wherein the UE assistance information further indicates a beam management parameter, wherein the beam management parameter comprises at least one of a preferred antenna panel, a preferred beam, information about a trajectory of the UE, or a mobility parameter for the UE.

9. The method of claim 1, wherein the UE assistance information further indicates power status information for the UE, wherein the power status information indicates at least one of a battery level, a thermal level of a modem, or a power preference for the UE.

10. The method of claim 1, further comprising:
    receiving a range of available parameters from the network entity; and
    selecting a parameter for the at least one preferred parameter from among the range of available parameters received from the network entity.

11. The method of claim 10, wherein the range of available parameters is received in a broadcast from the network entity or is received in a dedicated RRC signaling for the UE, and wherein the at least one preferred parameter comprises an index corresponding to a value selected from among the range of available parameters received from the network entity.

12. The method of claim 10, further comprising:
    determining that UE indication of the at least one preferred parameter is supported by the network entity based on receiving the range of available parameters from the network entity.

13. An apparatus for wireless communication at a User Equipment (UE), comprising:
    a memory; and
    at least one processor coupled to the memory and configured to:
       transmit, to a network entity, UE assistance information including:
          a delay budget report indicating a preference to adjust a connected mode discontinuous reception (DRX) configuration; and an indication of at least one preferred parameter for a UE configuration for each of a DRX long cycle, a DRX short cycle, a DRX inactivity timer, and a DRX short cycle timer; and receive a DRX configuration from the network entity.

14. A method of wireless communication at a network entity, comprising:
receiving, from a User Equipment (UE), UE assistance information including:
a delay budget report indicating a preference to adjust a connected mode discontinuous reception (DRX) configuration; and
an indication of at least one preferred parameter for a UE configuration for each of a DRX long cycle, a DRX short cycle, a DRX inactivity timer, and a DRX short cycle timer; and
configuring a DRX configuration for the UE.

15. The method of claim 14, wherein the UE assistance information further indicates a parameter for at least one of a Discontinuous Reception (DRX) on duration or a DRX slot offset.

16. The method of claim 14, wherein the at least one preferred parameter is indicated in an Information Element (IE).

17. The method of claim 14, wherein the UE assistance information further indicates a preferred discontinuous reception parameter including at least one of an average data rate, an average transport block size, or an average burst duration.

18. The method of claim 14, wherein the UE assistance information further indicates a preferred bandwidth configuration for the UE including at least one of an aggregated bandwidth across serving cells for different types of carriers, a downlink/uplink bandwidth part index for a serving cell, a number of uplink carriers, a number of downlink carriers.

19. The method of claim 14, wherein the UE assistance information further indicates a preferred data channel parameter including a maximum transport block size for a downlink data channel or an uplink data channel.

20. The method of claim 14, wherein the UE assistance information further indicates a preferred control channel parameter, wherein the preferred control channel parameter comprises at least one of a Time Division Duplex (TDD) pattern, a control channel monitoring periodicity, or a processing timeline related to feedback processing.

21. The method of claim 14, wherein the UE assistance information further indicates a beam management parameter, wherein the beam management parameter comprises at least one of a preferred antenna panel, a preferred beam, information about a trajectory of the UE, or a mobility parameter for the UE.

22. The method of claim 14, wherein the UE assistance information further indicates power status information for the UE, wherein the power status information indicates at least one of a battery level, a thermal level of a modem, or a power preference for the UE.

23. The method of claim 14, further comprising:
transmitting a range of available parameters from the network entity, wherein the at least one preferred parameter comprises a parameter selected from among the range of available parameters received from the network entity.

24. The method of claim 23, wherein the range of available parameters is broadcast from the network entity or is transmitted in a dedicated RRC signaling for the UE.

25. The method of claim 23, wherein the at least one preferred parameter comprises an index corresponding to a value selected from among the range of available parameters transmitted from the network entity.

26. An apparatus for wireless communication at a network entity, comprising:
a memory; and
at least one processor coupled to the memory and configured to:
receive, from a User Equipment (UE), UE assistance information including:
a delay budget report indicating a preference to adjust a connected mode discontinuous reception (DRX) configuration; and
an indication of at least one preferred parameter for a UE configuration for each of a DRX long cycle, a DRX short cycle, a DRX inactivity timer, and a DRX short cycle timer; and
configure a DRX configuration for the UE.

27. The apparatus of claim 13, wherein the memory and the at least one processor are configured to indicate the at least one preferred parameter in an Information Element (IE).

28. The apparatus of claim 13, wherein the memory and the at least one processor are configured to indicate the at least one preferred parameter and a preferred setting for the delay budget report in a UE Assistance IE (UAI).

29. The method of claim 1, wherein the UE assistance information further indicates an aggregated bandwidth preference for an aggregated bandwidth across serving cells for power savings at the UE.

30. The apparatus of claim 13, wherein the UE assistance information further indicates an aggregated bandwidth preference for an aggregated bandwidth across serving cells for power savings at the UE.

31. An apparatus for wireless communication at a User Equipment (UE), comprising:
means for transmitting, to a network entity, UE assistance information including:
a delay budget report indicating a preference to adjust a connected mode discontinuous reception (DRX) configuration; and
an indication of at least one preferred parameter for a UE configuration for each of a DRX long cycle, a DRX short cycle, a DRX inactivity timer, and a DRX short cycle timer; and
means for receiving a DRX configuration from the network entity.

* * * * *